Nov. 15, 1927.

W. E. BROUGHTON

CLUTCH MECHANISM

Filed April 4, 1921

INVENTOR.
Winn E. Broughton
by Jas. H. Churchill
atty.

Nov. 15, 1927.

W. E. BROUGHTON

CLUTCH MECHANISM

Filed April 4, 1921

INVENTOR.
Wm E. Broughton
by Jas. H. Churchill
atty.

Patented Nov. 15, 1927.

1,649,283

UNITED STATES PATENT OFFICE.

WINN E. BROUGHTON, OF PEABODY, MASSACHUSETTS, ASSIGNOR TO THE TURNER TANNING MACHINERY COMPANY, OF PEABODY, MASSACHUSETTS, A CORPORATION OF MAINE.

CLUTCH MECHANISM.

Application filed April 4, 1921. Serial No. 458,211.

This invention relates to a clutch mechanism of that character in which both members of the clutch are mounted on a shaft, and in which the longitudinally movable member is engaged with its co-operating member by means of a spring and is automatically disengaged by a cam or device on the spring-actuated clutch member co-operating with a cam or device capable of being controlled by the operator.

An object of the present invention is to provide an improved clutch of this general character which will be so organized as to insure that, when it is sought to disengage the longitudinally movable clutch member to render the clutch inoperative, the disengagement will be promptly and completely effected without liability of chattering. The invention is illustrated as embodied in a clutch of the type set forth in United States Letters Patent No. 1,165,066, granted December 21, 1915, on my application. It is to be understood, however, that in various aspects the invention is not limited to embodiment in a clutch mechanism so organized. In clutches of the type referred to, the longitudinally movable clutch member has been under the influence of the spring in both its operative or closed position and in its inoperative or open position. In accordance with the present invention, provision is made for rendering the clutch spring inactive, or de-energizing it, as the clutch is disengaged, so that the spring is normally untensioned. To this end, in the illustrated embodiment of the invention, an abutment collar is provided which operates, when moved in one direction, to energize the spring by progressively compressing it and thus cause the longitudinally movable clutch member to come into longitudinally yielding, but positive driving, engagement with the companion clutch member, and which operates, when moved in the opposite direction, to relieve the pressure on the spring before the longitudinally movable clutch member is disengaged. This insures that the clutch will operate properly even after long use and constant wear.

Figure 1:
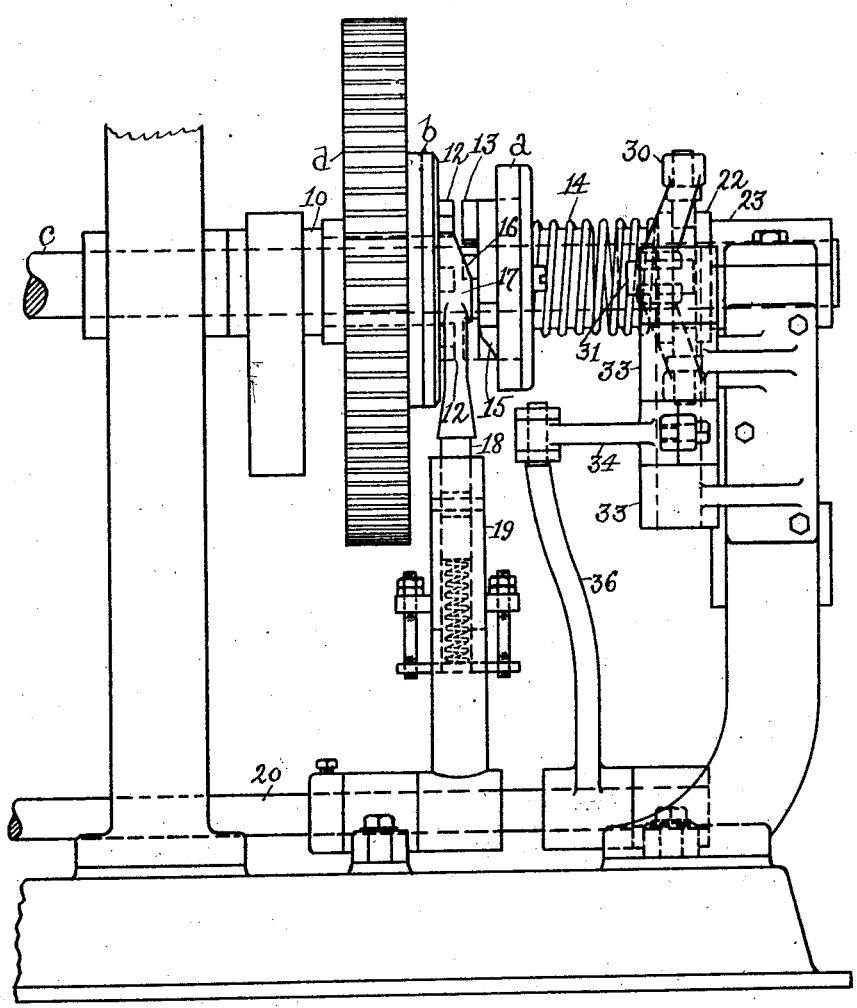
Fig. 1 is a front elevation of a portion of a machine provided with a clutch mechanism embodying this invention, the clutch being shown in inoperative position.
Figure 3:
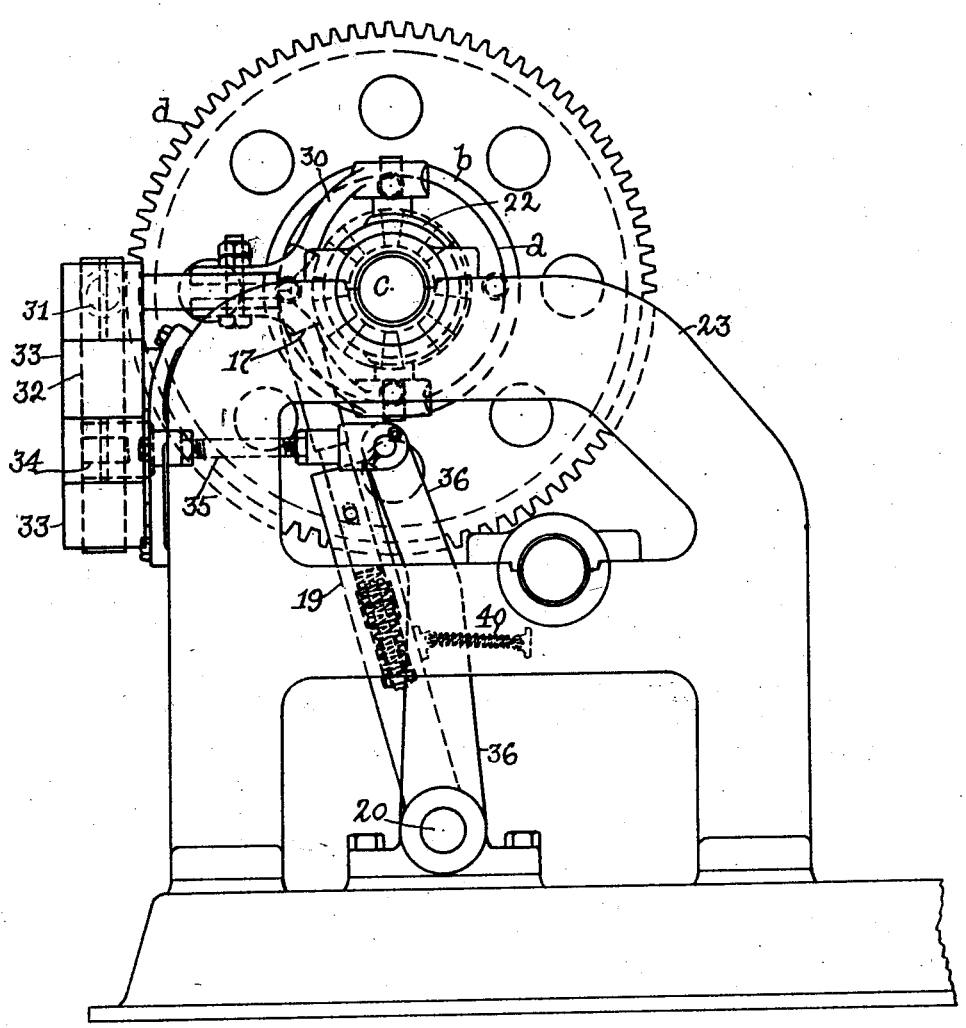

Fig. 3, an end elevation of Fig. 1 looking toward the left.

Referring to the drawings, $a$ represents the longitudinally movable or driven clutch member and $b$ the co-operating or driving member of the clutch mechanism.

The member $a$ is keyed or otherwise secured to the shaft $c$ to rotate therewith and to slide thereon toward and from the member $b$, which is shown as attached to a gear $d$ which is normally loose on the shaft $c$ but has a fixed longitudinal position thereon by reason of the collar 10.

The member $b$ is provided with suitable teeth, projections or lugs 12, with which co-operate like teeth, projections or lugs 13 on the member $a$, which has co-operating with it a spring 14 on the shaft $c$. The member $a$ also is provided with one or more cams or like devices 15 with which co-operates a cam or inclined surface 16 on a head 17 attached to a rod 18 connected with a crank or arm 19 on a rock-shaft 20. The parts as thus far described are and may be substantially the same as shown and described in the patent above referred to.

In the present instance, however, the spring 14 is constructed and arranged so as to be inactive upon the longitudinally movable clutch member $a$ when the latter is in its inoperative or disengaged position, shown in Fig. 1, and said spring has co-operating with it means for moving it on the shaft $c$ so as to render it active to exert pressure upon the clutch member $a$ and engage the latter with the member $b$. In the present instance, the shaft $c$ has loosely mounted on it a grooved collar 22, which is capable of being moved on the shaft $c$ lengthwise thereof. The collar 22 normally bears against the upright 23 in which the shaft $c$ is journaled, and may be moved on the shaft $c$ toward and from the longitudinally movable clutch member $a$ in any suitable manner. The spring 14 and collar 22 are constructed and arranged with relation to each other and the upright 23, so that when the clutch member $a$ is disengaged from the clutch member $b$, and the collar 22 is in its normal position against the upright 23, the spring 14 is at such time inactive upon the clutch member

Figure 2:
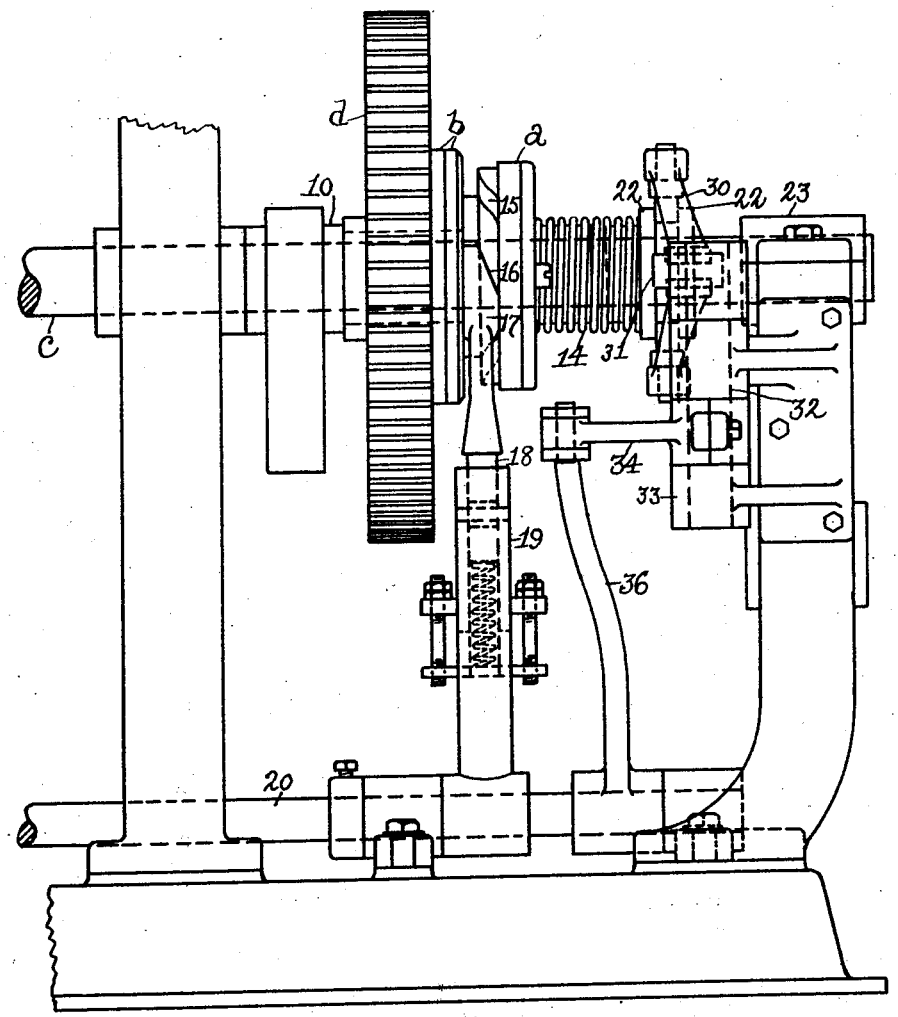
Fig. 2 is a like view with the clutch mechanism in its operative position.

*a* and does not exert pressure upon said clutch member. When however the collar 22 is moved away from the upright 23 and from the position shown in Fig. 1 into that shown in Fig. 2, it serves as an abutment to compress the spring 14 and cause the latter to move the teeth 13 of the clutch member *a* into engagement with the teeth 12 of the clutch member *b* after the manner represented in Fig. 2, and when the clutch members are so engaged, the parts driven by the shaft *c* are set in operation.

As soon as the clutch member *a* has been engaged with the clutch member *b*, the abutment collar 22 can be moved back into its normal or starting position against the upright 23 as shown in Fig. 1. When the collar 22 is moved away from the clutch member *a*, the pressure or tension of the spring 14 upon the clutch member *a* is diminished until the spring exerts no pressure or no appreciable pressure upon the clutch member *a*, and therefore becomes inactive upon the clutch member *a*, and the arrangement of the parts, to wit: Clutch member *a*, spring 14, collar 22 and upright 23, is such that in the present instance, the clutch member *a* in its normal or inoperative position is separated from the collar 22 in its normal position a sufficient distance to ensure the inactive condition of the spring, and as a result, when the cam 16 acting on the cam 15 moves the clutch member *a* into its normal or inoperative position, the said clutch member is not canted or tilted on the shaft *c* by the spring 14 so as to cause engagement of some of the teeth on this clutch member *a* with the teeth on the co-operating clutch member *b*, thus insuring that, even if after long use and constant wear the longitudinally movable clutch member becomes loose on the shaft, there will be no tendency for a machine operated through the clutch to continue in operation after the said clutch member has been brought into its inoperative position and no tendency for the clutch to chatter when it is attempted to disengage this clutch member, as would occur if it were somewhat tilted on the shaft although not enough to start or continue the machine in operation, in which case the teeth on the longitudinally movable clutch member would click by the teeth on the co-operating clutch member.

The abutment collar 22 may be moved on the shaft *c* in any suitable manner, and in the present instance one construction or arrangement is shown by which it is moved from the rock shaft 20. To this end, a groove in the collar 22 is engaged by a yoke 30 attached to a crank or arm 31 extended from a vertically arranged rock-shaft 32 having bearings in arms 33 attached to the upright 23 and provided with a second crank or arm 34, which is joined by a connecting rod or link 35 with a crank or arm 36 on the rock shaft 20, the arrangement of these parts being such, that when the rock shaft 20 is turned in one direction by a foot treadle or other means (not shown), the collar 22 is moved to compress the spring 14 and cause the latter to throw in the clutch member *a* simultaneously with the removal of the cam member 17 from engagement with the cam 15 on the clutch member *a*. As soon as the clutch member *a* has been thrown in, the operator can release the foot treadle and the cam member or head 17 will be entered between the clutch members *a*, *b*, by a spring 40 into position to be engaged by the cam 15 on the clutch member *a*. When the cam head 17 is thus positioned, the collar 22 is simultaneously moved back to its starting position, and the clutch member *a* will be thrown out when its cam 15 engages the cam head 17, as more fully explained in the patent referred to above.

From the above description, it will be seen that the spring 14 cushions the engagement of the teeth of the longitudinally movable member *a* with the teeth of the member *b*, and that the member *a* is under the influence of said spring while it is being thrown into operative relation with its co-operating member *b*, and that as soon as this operative relation has been established, the member *a* can be relieved from the influence of the spring by moving the actuator for the spring, to wit: the abutment collar 22, back to its normal position, and thereby leave the longitudinally movable clutch member free to be moved by the automatic clutch opening device entirely independent of and uninfluenced by any spring tension or pressure.

One embodiment of the invention is herein shown but it is not desired to limit the invention to the particular construction shown.

Claims:

1. In combination, a rotatable shaft, a clutch controlling the rotation of said shaft provided with co-operating members, one of which is movable toward and away from the other, a spring coaxial with the shaft for moving the movable clutch member into engagement with its co-operating member, means for automatically disengaging said clutch members, and means co-operating with the spring for compressing the same and rendering it active upon the movable clutch member to cause the latter to engage its co-operating member and for removing the compression in the spring after the clutch members have been engaged.

2. In combination, a rotatable shaft, a clutch controlling the rotation of said shaft provided with co-operating members, one of which is movable toward and away from the other, a spring coaxial with the movable clutch member, means for compressing the spring to yieldingly move the movable clutch member into engagement with its co-operating member and for thereafter removing the compression in the spring to render the latter inactive upon said movable clutch member, and means for disengaging said movable clutch member from its co-operating member independently of said spring.

3. In combination, a rotatable shaft, a clutch controlling rotation of said shaft and provided with co-operating members provided on their adjacent faces with co-operating teeth and one of which is movable toward and from the other, a spring on said shaft to act on said movable member and normally inactive for engaging the movable member with its co-operating member, a device movable on said shaft for actuating said spring to compress the same and render it active on said movable clutch member and for removing the compression in the spring and render it inactive on said movable clutch member, a device for disengaging said clutch members, a rock-shaft to which said disengaging device is connected to be actuated thereby, and means for connecting said rock-shaft with the actuating device for said spring.

4. A clutch having, in combination, a shaft, a driving clutch member, a driven clutch member mounted to turn with the shaft and to slide thereon, a normally untensioned spring coaxial with the shaft, a sliding abutment collar on the shaft, and means to slide the collar to compress the spring progressively and bring the driven clutch member into longitudinally yielding, but positive driving engagement with the driving clutch member.

5. A clutch having, in combination, a shaft, a driving clutch member, a driven clutch member, one of said members being mounted to slide on the shaft, a spring arranged to revolve with the shaft, and means to energize the spring and bring one of the clutch members into yielding engagement with the other clutch member and to de-energize the spring during disengagement of the clutch members.

6. A clutch having, in combination, a shaft, a driving clutch member, a driven clutch member, one of said members being mounted to slide on the shaft, a spring arranged to revolve with the shaft, an abutment collar movable in one direction to energize the spring and bring one of the clutch members into a yielding engagement with the other clutch member, and movable in the opposite direction to de-energize the spring during disengagement of the clutch members.

7. A clutch having, in combination, a shaft, a driving clutch member, a driven clutch member, one of said members being mounted to slide on the shaft, a spring arranged to revolve with the shaft, a movable abutment for the spring, mechanism to move the abutment in one direction to energize the spring and bring one of the clutch members into yielding engagement with the other clutch member and to move the abutment in the opposite direction to relieve the spring pressure, devices for controlling the engagement and disengagement of the clutch members, and means for controlling said mechanism and said devices in timed relation.

8. A clutch having, in combination, a shaft, a driving clutch member, a driven clutch member, one of said members being mounted to slide on the shaft, a spring arranged to revolve with the shaft, a movable abutment for the spring, mechanism to move the abutment in one direction to energize the spring and bring one of the clutch members into yielding engagement with the other clutch member and to move the abutment in the opposite direction to relieve the spring pressure, devices for controlling the engagement and disengagement of the clutch members, and means for controlling said mechanism and said devices to energize the spring when said devices are positioned to allow engagement of the clutch members and to relieve the spring pressure when said devices are positioned to disengage said members.

In testimony whereof, I have signed my name to this specification.

WINN E. BROUGHTON.